F. C. WEBER & F. M. ALLEN.
FISH POSITIONING MACHINE.
APPLICATION FILED DEC. 16, 1915.

1,185,744.

Patented June 6, 1916.

Witness

Inventors
Frederick C. Weber
Frank M. Allen

UNITED STATES PATENT OFFICE.

FREDERICK C. WEBER, OF BETHESDA, MARYLAND, AND FRANK M. ALLEN, OF WASHINGTON, DISTRICT OF COLUMBIA.

FISH-POSITIONING MACHINE.

1,185,744. Specification of Letters Patent. Patented June 6, 1916.

Application filed December 16, 1915. Serial No. 67,215.

(DEDICATED TO THE PUBLIC.)

*To all whom it may concern:*

Be it known that we, FREDERICK C. WEBER and FRANK M. ALLEN, citizens of the United States of America, and employees of the Department of Agriculture of the said United States, said FREDERICK C. WEBER residing in the town of Bethesda, State of Maryland, (whose postoffice address is Bethesda, Maryland,) and the said FRANK M. ALLEN residing in the city of Washington, District of Columbia, (whose post-office address is Washington, District of Columbia,) have invented a new and useful Improvement in Fish-Positioning Machines.

This application is made under the act of March 3, 1883, chapter 143 (22. Stat., 625), and the invention herein described and claimed may be used by the Government of the United States or any of its officers or employees in the prosecution of work for the United States, or by any person in the United States, without the payment of any royalty thereon.

Our invention relates to a machine adapted to the purpose of arranging fish in position, head first, for any purpose, preferably for delivery to a cutting and eviscerating machine.

The object of the invention is to provide a device which, by proper arrangement and manipulation, will cause fish, when led into it, to leave the device with the heads all pointing in one direction.

The invention consists in the combination and arrangement of parts as specified in the following specification and particularly pointed out in the claims thereof.

Figure 1:
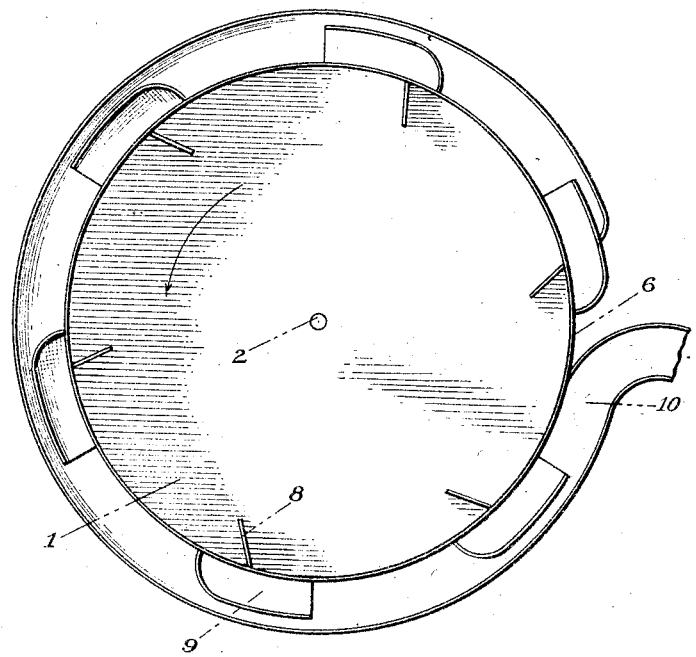
Figure 2:
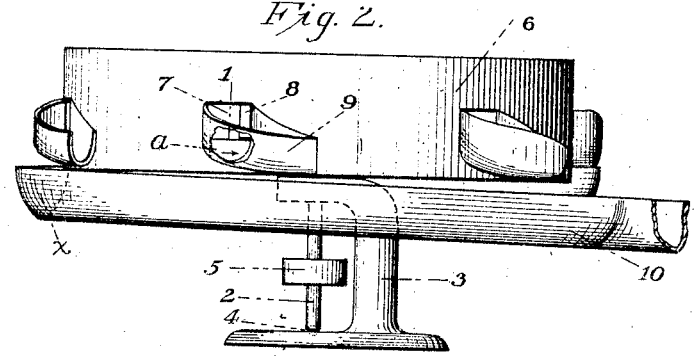

Referring to the drawings: Figure 1 is a top plan view of our invention, and Fig. 2 is a side sectional view of the device.

Fish arranged according to size, which is necessary for the successful operation of our device, are led by a stream of water in any suitable trough to the positioning device (Fig. 1), which is a large revolving disk 1, rotating in a horizontal plane in the direction of the arrows, upon a vertical axis, 2, having a bearing, 3, with thrust bearing, 4, and driven by a pulley, 5. This disk, 1, is revolved at suitable speed, depending upon the size of fish to be positioned. The disk, 1, is surrounded by a vertical wall, 6, of any suitable height, and at intervals through this wall are openings, 7, the bottom of these openings, 7, being as indicated at $a$, in Fig. 2. At each opening, 7, is a guide, 8, which projects into the active plane and upon the top of revolving disk, 1, and is inclined from the revolving axis, 2, at a suitable angle to cause any fish upon the disk, 1, to pass off said disk through openings, 7, and in the same manner as they approach the boundary wall, 6, that is—head first. At each of the openings, 7, and attached to wall, 6, is a curved spout, 9, which empties into a circular trough, 10. This trough in relation to the plane of disk is arranged in the form of a spiral of suitable pitch and form, as shown at $x$ in Fig. 2, to carry the fish in the same position in which they leave the revolving disk, 1.

Having thus described our invention, what we claim as new and desire by Letters Patent to secure is:

1. A machine for positioning fish having, in combination, a surface revolving in a horizontal plane, a receiving trough and a stationary wall surrounding said surface provided with openings to permit of the delivery of the positioned fish from said surface to the receiving trough, substantially as described.

2. A machine for positioning fish having, in combination, a surface revolving in a horizontal plane, a stationary wall surrounding said surface provided with openings, and projecting guides for directing the positioned fish into said openings, substantially as described.

3. A machine for positioning fish having, in combination, a surface revolving in a horizontal plane, a stationary wall surrounding said surface provided with openings, and curved spouts leading from said stationary wall for directing the positioned fish from the revolving surface into a trough, substantially as described.

4. A machine for positioning fish having, in combination, a surface revolving in a horizontal plane, a stationary wall surrounding said surface provided with openings, curved spouts leading from said stationary wall, and a spiral receiving trough to conduct the fish arranged in the same position as when they leave the revolving surface, substantially as described.

In testimony whereof, we have hereunto set our hands in the presence of two subscribing witnesses.

FREDERICK C. WEBER.
FRANK M. ALLEN.

Witnesses:
HARRISON E. PATTEN,
W. G. CARRIGAN, Jr.